A. A. ACKERMAN.
CONVERTIBLE BODY FOR AUTOMOBILES.
APPLICATION FILED APR. 15, 1912.
1,052,552.
Patented Feb. 11, 1913.
2 SHEETS—SHEET 1.
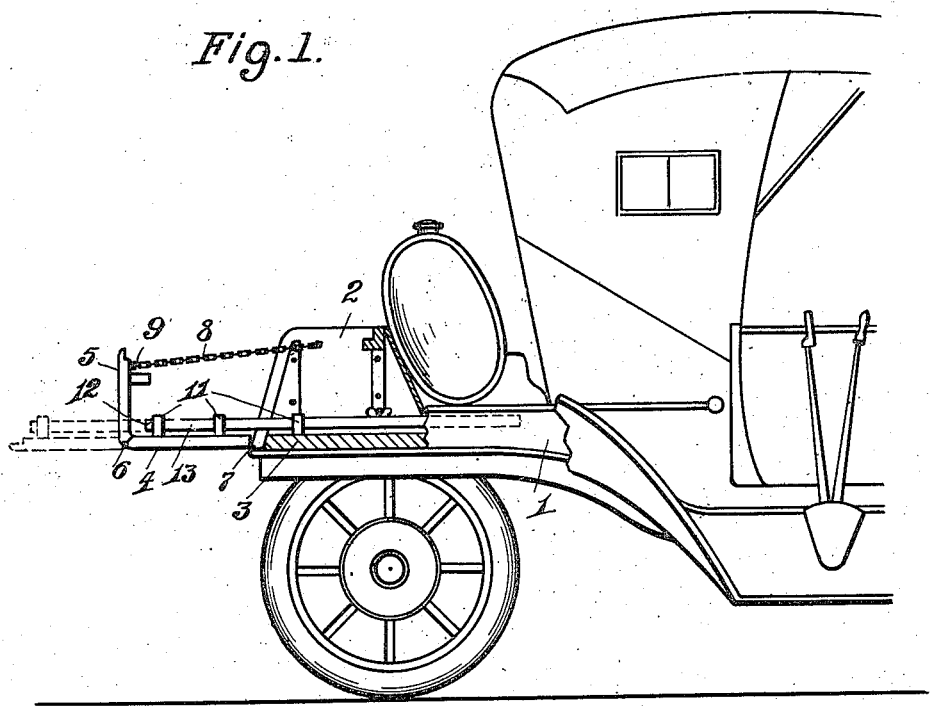
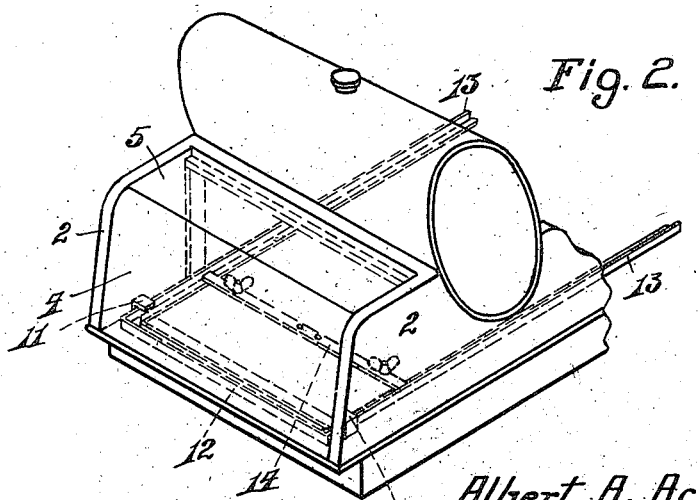
Witnesses:
L. W. Cook.
Albert A. Ackerman.
Inventor
By George J. Oltsch.
Attorney.

A. A. ACKERMAN.
CONVERTIBLE BODY FOR AUTOMOBILES.
APPLICATION FILED APR. 15, 1912.
1,052,552.
Patented Feb. 11, 1913.
2 SHEETS—SHEET 2.
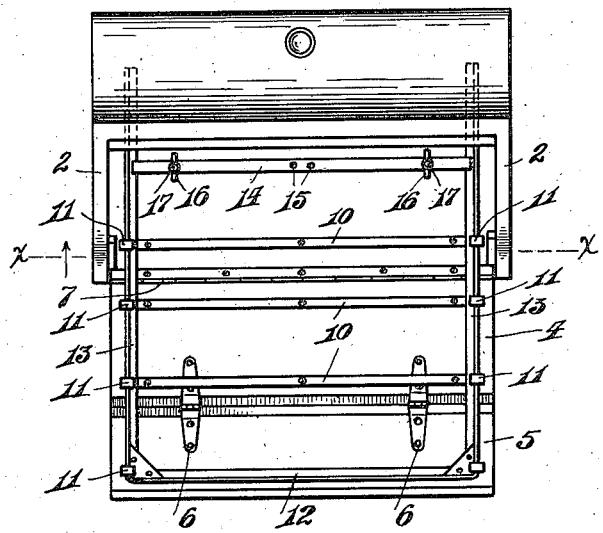
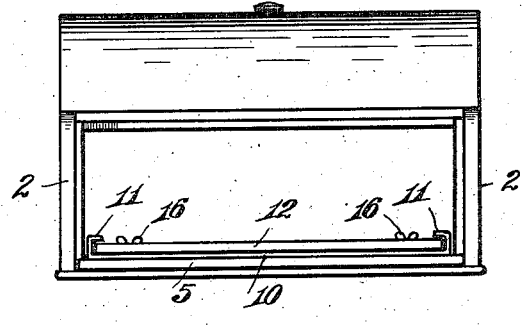
Albert A. Ackerman.
Inventor
By George G. Oltsch.
Attorney.

UNITED STATES PATENT OFFICE.

ALBERT A. ACKERMAN, OF SOUTH BEND, INDIANA, ASSIGNOR OF ONE-HALF TO HARRY A. ENGMAN, OF SOUTH BEND, INDIANA.

CONVERTIBLE BODY FOR AUTOMOBILES.

1,052,552.  Specification of Letters Patent.  Patented Feb. 11, 1913.

Application filed April 15, 1912. Serial No. 690,880.

*To all whom it may concern:*

Be it known that I, ALBERT A. ACKERMAN, a citizen of the United States, residing at South Bend, in the county of St. Joseph and State of Indiana, have invented certain new and useful Improvements in Convertible Bodies for Automobiles, of which the following is a specification.

My invention relates to a convertible body for automobiles, and it has for its object the provision of a body structure which may be easily and quickly adjusted into either of three different forms, as occasion may require, so as to provide either a closed compartment suitable for storage purposes, a partially extended form of the type known to the trade as a suburban body, and a fully extended form providing a platform of considerable extent, all of which structure is so arranged that when in the first position mentioned, no parts thereof are exposed to the eye, and the advantages due to its convertibility does not detract from the symmetry or graceful outlines of the body.

A further object of the invention resides in the provision of a convertible body for automobiles, in order that a carrier may be handily and quickly provided for the support of luggage and goods to be transported, and in which the parts of the carrier form the major portion of the compartment body when in a folded or closed position.

With the above, and other objects in view, the invention consists in the novel arrangement and coöperation of parts, all of which will be more fully described hereinafter and pointed out in the appended claims.

Figure 1 is a side elevation, partly in section, of the rear end of an automobile embodying my invention. Fig. 2 is a perspective view of the rear end of the convertible automobile body in closed position. Fig. 3 is a top or plan view showing the body in fully extended position. Fig. 4 is an end view of parts shown in Fig. 3, and Fig. 5 is a cross-sectional view of the body platform taken on the line X—X of Fig. 3.

In the accompanying drawings, which show the preferred embodiment of my invention, 1 designates the body of an automobile, provided with the usual underframe construction and, for the purpose of the present invention, provided with a chest or closed compartment formed by the two sides 2—2, bottom 3, rear end section 4 and top 5. The chest when closed forms a roomy compartment for the storage of luggage, etc., and a protection for the same against the weather, as well as against dirt and dust.

In order to provide greater carrying capacity, the top section 5 of the chest is hingedly connected at 6 to the end section 4, which latter is also hinged at 7, so that the top and end sections may be opened outwardly, the latter in the same plane with the bottom 3, so as to form a continuation thereof, and the top section held in a vertical plane by any suitable means, as by a supporting chain 8, which may be attached to the inner face of each side section 2, so as to be concealed within the chest when the end and top are in closed position, the ends 9 thereof being secured to the top section by any suitable means permitting the ready detachment thereof. Fixedly secured to the bottom, end and top sections of the chest are hanger-bars 10, disposed in spaced relation, the opposite ends 11 of which are turned upwardly and inwardly to form hangers for engagement with a supporting frame 12, made of angle-iron and mounted for endwise slidable movement, the side bars 13 of which pass beneath the hangers 11, thus firmly supporting the end section to sustain great weight without sagging. The inner ends of the side bars of the supporting frame 12 are held against upward movement, or against accidental movement in any direction, by a clamping bar 14, which is secured intermediate its ends to the bottom 3, as by screws 15, and the free ends of which rest upon said side bars, as plainly shown in Fig. 5. Thumb-nuts 16, in connection with threaded bolts 17 passing through holes in the clamping bar permit the free ends of the latter to be forced down tightly upon the side bars and thus clamp the latter against accidental movement in any direction. By unscrewing the thumb-screws and releasing the free ends of the clamping bar, the supporting frame may be freely shifted endwise.

In Fig. 2 is shown the chest in closed position, with the supporting frame, clamping bars and other appurtenances confined within the chest and body of the automobile, so as to be out of sight, the chest being sufficiently roomy to store considerable luggage or other articles. If it is desired to provide more space for carrying purposes, the top and ends of the chest are opened, the latter in line with the bottom 3 of the chest, and the supporting frame is slid out so as to pass under the hangers, after which the top is swung on its hinges into a vertical position and there held by means of the chains, all as heretofore described, thus providing an end-gate, and a platform space sufficient to carry several trunks or other luggage, all of which is plainly shown by full lines in Fig. 1. If still more platform space is desired, the top section 5 is lowered, as shown by dotted lines in Fig. 1, in line with the chest bottom 3 and end section 4, and the supporting frame drawn outwardly so as to engage the hanger on said section, thus providing the maximum platform space.

It will be observed from the foregoing description, that I thus provide a convertible body for automobiles, which is exceedingly simple in structure, easily and quickly adjusted, and convertible into either a closed chest for the rear end of the body, a suburban body or an open platform, all combined and arranged whereby all parts are hidden and out of view when the parts are arranged to form a closed chest.

Having thus described my invention, what is claimed is:

1. The combination with a vehicle body comprising an end chest having bottom, side, rear and top sections, the rear section being hingedly connected to said body and with the top section, of a supporting frame slidably mounted in said body, and means carried by said rear and top sections co-operating with said supporting frame to support the latter in open adjusted relation.

2. The combination with a vehicle body comprising an end chest having bottom, side, rear and top sections, the rear section being hingedly connected to said body and with the top section, of supporting means slidably mounted in said body and within said chest, and means carried by said rear and top sections adapted for engagement with said slidable supporting means to support said sections in the same plane with the bottom section.

3. The combination with a vehicle body comprising an end chest having bottom, side, rear and top sections, said rear section being hingedly connected to said body and with said top section, of hanger members carried by said top and rear sections, and supporting means mounted in said body and slidable outwardly for engagement with said hanger members to support said top and rear sections when in open relation, and means for securing said supporting means against movement.

4. The combination with a vehicle body comprising an end chest having a bottom, side, rear and top sections, the rear section being hingedly connected with said body and with the top section to permit the said rear and top sections to be swung in the same plane with the bottom section, of supporting means slidable within the body and adapted to be shifted outwardly, and means mounted on said rear and top sections in spaced relation and under which said supporting means passes to support the same.

5. The combination with a vehicle body comprising an end chest having a bottom, side, rear and top sections, the rear section being hingedly connected with said body and with the top section, of a rigid supporting frame slidably mounted in said chest and body and adapted to support said rear and top sections when in open relation, hanger members on said rear and top sections for engagement with said supporting frame when shifted outwardly, a clamping bar mounted in the chest, and adjustable means for clamping said bar to the supporting frame to hold the latter against accidental movement.

6. The combination with a vehicle body comprising an end chest having a bottom, side, rear and top sections, the rear section being hingedly connected with said body and with the top section, of a rigid supporting frame slidably mounted in said chest and body and adapted to support said rear and top sections when in open relation, said frame comprising parallel spaced side bars, means carried by said rear and top sections for engagement with the side bars of said supporting frame when shifted outwardly, a clamping bar fixedly mounted intermediate its ends within the chest and its free ends extending over said side bars, and adjustable means for holding the free ends of said bar in clamping engagement with said side bars.

7. The combination with a vehicle body comprising a rear chest having a bottom, side, rear, and top sections, of connecting means permitting said rear and top sections to be opened outwardly so as to form a continuation of the bottom section with the rear section and an end gate with the top section, a supporting frame mounted on said body and shiftable endwise for the support of the rear section, and means for supporting the top section in position to form an end gate.

8. The combination with a vehicle body comprising a rear chest having a bottom, side, rear, and top sections, of connecting means permitting said rear and top sections to be opened outwardly in the same plane with the bottom section, and a supporting member carried by the body and shiftable endwise to support the end and top sections in open adjusted relation.

In testimony whereof I affix my signature in presence of two witnesses.

ALBERT A. ACKERMAN.

Witnesses:
L. W. HAMMERSCHMIDT,
L. W. COOK.